United States Patent
Karri et al.

(10) Patent No.: US 11,683,224 B1
(45) Date of Patent: Jun. 20, 2023

(54) DEVICE INTRODUCTION INTO AN EXISTING ECOSYSTEM

(71) Applicant: INTERNATIONAL BUSINESS MACHINES CORPORATION, Armonk, NY (US)

(72) Inventors: Venkata Vara Prasad Karri, Visakhapatnam (IN); Partho Ghosh, Kolkata (IN); Saraswathi Sailaja Perumalla, Visakhapatnam (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/655,005

(22) Filed: Mar. 16, 2022

(51) Int. Cl.
*H04L 41/0806* (2022.01)
(52) U.S. Cl.
CPC .............................. *H04L 41/0806* (2013.01)
(58) Field of Classification Search
None
See application file for complete search history.

(56) References Cited

U.S. PATENT DOCUMENTS

| | | | |
|---|---|---|---|
| 10,587,482 B2 | 3/2020 | Harat | |
| 11,102,064 B2 | 8/2021 | Grant | |
| 11,190,266 B1* | 11/2021 | Black | H04W 12/069 |
| 11,463,322 B1* | 10/2022 | Sha | H04L 41/145 |
| 2018/0181385 A1 | 6/2018 | Riedl | |
| 2019/0260831 A1* | 8/2019 | Milev | H04L 67/125 |
| 2020/0167834 A1 | 5/2020 | Matsuoka | |
| 2020/0394351 A1 | 12/2020 | Roemerman | |
| 2021/0042940 A1* | 2/2021 | Mitra | H04N 5/268 |
| 2021/0067411 A1* | 3/2021 | Grant | H04L 41/0816 |
| 2021/0193334 A1 | 6/2021 | Turrin | |
| 2021/0390476 A1 | 12/2021 | Kono | |
| 2022/0066436 A1* | 3/2022 | Platenius-Mohr | G05B 19/41845 |

FOREIGN PATENT DOCUMENTS

CN 109856980 A 6/2019

OTHER PUBLICATIONS

Mell et al., "The NIST Definition of Cloud Computing", National Institute of Standards and Technology, Special Publication 800-145, Sep. 2011, pp. 1-7.

(Continued)

*Primary Examiner* — Scott B Christensen
(74) *Attorney, Agent, or Firm* — Tihon Poltavets (57) ABSTRACT

A method for introducing a new IoT device into an existing ecosystem with multiple IoT devices includes identifying existing IoT devices at a location and generating a digital twin model for each existing IoT device. The method also includes identifying tasks performed by each existing IoT devices at the location and receiving a selection for a new IoT device for introduction with the existing IoT devices based on the tasks performed by each of the existing IoT devices and the generated digital twin models for the plurality of existing IoT devices. In response to determining the new IoT device is suitable for the introduction to the location with the existing IoT devices, the method also includes performing a configuration for the new IoT device based on the tasks performable by the new IoT device.

20 Claims, 5 Drawing Sheets

(56) References Cited

OTHER PUBLICATIONS

International Searching Authority, "International Search Report and Written Opinion of the International Searching Authority", International Application No. PCT/CN2023/072300, dated May 11, 2023, 7 pages.

Karri et al., "Device Introduction Into an Existing Ecosystem", International Application No. PCT/CN2023/072300, International Filing Date Jan. 16, 2023, 38 pages.

\* cited by examiner

DEVICE INTRODUCTION INTO AN EXISTING ECOSYSTEM

BACKGROUND

This disclosure relates generally to Internet of Things (IoT) devices and in particular to introducing a new IoT device into an existing ecosystem with multiple IoT devices.

Internet of Things (IoT) devices are pieces of hardware that include embedded sensors, processing ability, software, and other technologies that exchange data with other devices and systems over a communication network. In an IoT ecosystem, multiple IoT devices interact with one another and exchange data to perform tasks in a collaborative manner. In an industrial setting, such as a warehouse or manufacturing facility, various IoT devices are typically integrated in assisting with the assembly, movement, and storage of products at corresponding points along a supply chain.

SUMMARY

Embodiments in accordance with the present invention disclose a method, computer program product and computer system for introducing a new IoT device into an existing ecosystem with multiple IoT devices, the method, computer program product and computer system can identify a plurality of existing IoT devices at a location. The method, computer program product and computer system can generate a digital twin model for each of the plurality of existing IoT devices at the location, wherein the digital twin model is based on data gathered from a plurality of sensors on the plurality of existing IoT devices. The method, computer program product and computer system can identify one or more tasks performed by each of the plurality of IoT devices at the location. The method, computer program product and computer system can receive a selection for a new IoT device for introduction to the location with the plurality of IoT devices based on the one or more tasks performed by each of the plurality of IoT devices and the generated digital twin models for the plurality of existing IoT devices. The method, computer program product and computer system can, responsive to determining one or more tasks performable by the new IoT device, determine whether the new IoT device is suitable for the introduction to the location with the plurality of IoT devices. The method, computer program product and computer system can, responsive to determining the new IoT device is suitable for the introduction to the location with the plurality of IoT devices, perform a configuration for the new IoT device based on the one or more tasks performable by the new IoT device at the location.

DETAILED DESCRIPTION

Embodiments of the present invention determine whether a new IoT device is suitable for introduction into an existing ecosystem with multiple IoT devices and based on a digital simulation, configures the new IoT device for introduction into the existing ecosystem. Embodiments of the present invention identifies each existing IoT device at a location and generate a digital twin model for each existing IoT device at the location based on specification information and a live feed of data from various embedded sensors. Embodiments of the present invention identify tasks performed by each existing IoT device and how the existing IoT devices interact to form an ecosystem for collecting performing a task. Embodiments of the present invention receive a selection for a new IoT device for introduction with the existing IoT devices in the ecosystem at the location and determine tasks performable by the new IoT device. Embodiments of the present invention perform a digital twin simulation with the new IoT device and the existing IoT devices to determine whether the new IoT device is suitable for introduction into the ecosystem at the location. In event the new IoT device is suitable for introduction into the ecosystem at the location, embodiments of the present invention perform a configuration for the new IoT device based on the digital simulation to introduce the new IoT device into the ecosystem with the existing IoT devices at the location. Embodiments of the present invention improve of integrating a new IoT device into an ecosystem of existing IoT devices, to ensure accelerated introduction with reduced down time which can reduce any adverse impacts on a supply chain. Furthermore, embodiments of the present invention can improve on efficiency and safety of the ecosystem with the introduction of the new IoT device, since embodiments of the present invention account for stationary objects, mobile objects, and any local governance laws when integrating the new IoT device with the existing IoT devices.

Figure 1:
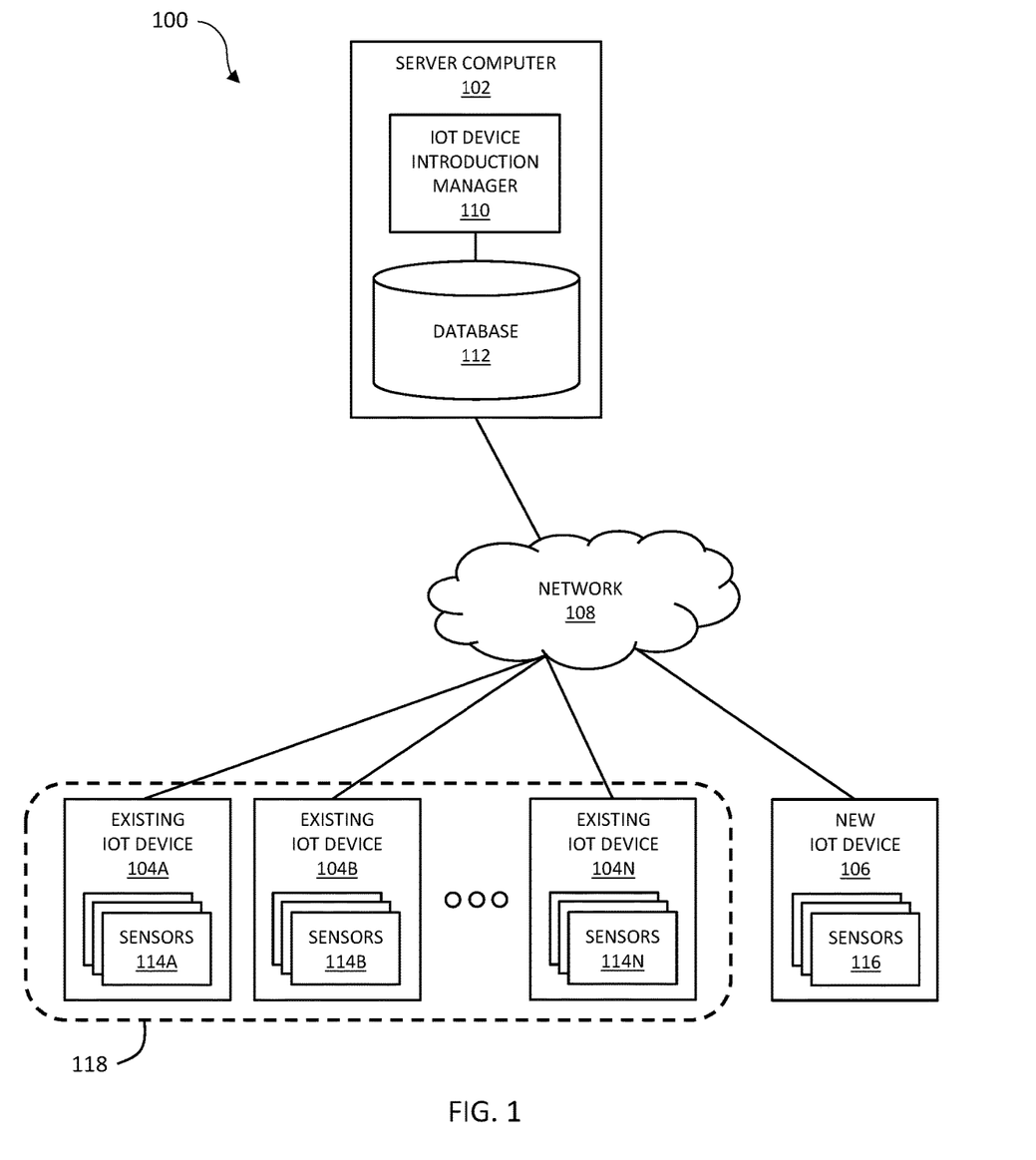
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment includes server computer 102, existing IoT devices 104A, 104B, 104N, and new IoT device 106, all interconnected over network 108. Existing IoT device 104N represents the $n^{th}$ IoT device 104 in an ecosystem, such as, the $12^{th}$ or $15^{th}$ IoT device 104. Server computer 102 can be a standalone computing device, a management server, a web server, a mobile computing device, or any other electronic device or computing system capable of receiving, sending, and processing data. In other embodiments, server computer 102 can represent a server computing system utilizing multiple computers as a server system, such as in a cloud computing environment. In another embodiment, server computer 102 can be a laptop computer, a tablet computer, a netbook computer, a personal computer (PC), a desktop computer, or any programmable electronic device capable of communicating with existing IoT device 104A, 104B, 104N, new IoT device 106, and other computing devices (not shown) within the distributed data processing environment via network 108. In another embodiment, server computer 102 represents a computing system utilizing clustered computers and components (e.g., database server computers, application server computers, etc.) that act as a single pool of seamless resources when accessed within the distributed data processing environment. Server computer 102 includes IoT introduction manager 110 and database 112. Server computer 102 may include internal and external hardware components, as depicted and described in further detail with respect to FIG. 3.

Existing IoT device 104A, 104B, 104N, and new IoT device 106 each represent an object with respectively embedded sensors 114A, 114B, 114N, and 116, where each of the objects include data processing abilities, software, and other hardware to facility the exchange of data with other devices and systems over a network, such as, network 108. Existing IoT device 104A, 104B, and 104N includes various sensors 114A, 114B, and 114N, respectively, for collecting data and send the data to IoT device introduction manager 110. New IoT device 106 includes various sensors 116 for collecting and sending the data to IoT device introduction manager 110. Examples of existing IoT device 104A, 104B, 104N and new IoT device 106 include objects such as, appliances, home security systems, health monitoring devices, factory equipment, wireless inventory trackers, biometric security scanners, and any other electronic device embedded with sensors and software for connecting and exchanging data with other devices and systems over the Internet (e.g., network 108). Example of sensors 114A, 114B, 114N, and 116 include but are not limited to, temperature sensors, humidity sensors, pressure sensors, proximity sensors, level sensors, accelerometers, gyroscope sensors, gas sensors, optical sensors, and infrared sensors.

Network 108 can be, for example, a telecommunications network, a local area network (LAN), a wide area network (WAN), such as the Internet, or a combination of the three, and can include wired, wireless, or fiber optic connections. Network 108 can include one or more wired and/or wireless networks capable of receiving and transmitting data, voice, and/or video signals, including multimedia signals that include voice, data, and video information. In general, network 108 can be any combination of connections and protocols that will support communications between server computer 102, existing IoT device 104A, 104B, 104N and new IoT device 106 and other computing devices (not shown) within the distributed data processing environment.

IoT device introduction manager 110 identifies existing IoT devices 104A, 104B, and 104N at a location, such as, a warehouse or manufacturing facility and generates a digital twin model for each of existing IoT device 104A, 104B, and 104N at the location. A digital twin model is a virtual representation of a real-time digital copy of a physical object, where the digital twin model is based on data from sensors 114A, 114B, and 114N for existing object 104A, 104B, and 104, respectively. IoT device introduction manager 110 identifies tasks performed by each of existing IoT device 104A, 104B, and 104N, based on product specification for each existing IoT device 104A, 104B, and 104N and data from sensors 114A, 114B, and 114N. IoT device introduction manager 110 receives a selection for new IoT device 106 with sensors 116 for introduction into an ecosystem with existing IoT device 104A, 104B, and 104N. IoT device introduction manager 110 determines tasks performable by new IoT device 106, based on product specification for new IoT device 106. IoT device introduction manager 110 determines whether new IoT device 106 is suitable for introduction into the ecosystem with existing IoT device 104A, 104B, and 104N based on a digital twin simulation with the new IoT device 106. If IoT device introduction manager 110 determines new IoT device 106 is suitable for introduction into the ecosystem, IoT device introduction manager 110 performs a configuration for new IoT device 106 for introduction into the ecosystem based on the results of the digital simulation. If IoT device introduction manager 110 determines new IoT device 106 is not suitable for introduction into the ecosystem, IoT device introduction manager 110 determines an alternative IoT device for introduction with existing IoT device 104A, 104B, and 104N and sends the alternative IoT device information to an administrative user.

Database 112 is a repository that stores various operational data from existing IoT device 104A, 104B, 104N, and new IoT device 106, floorplans (e.g., manufacturing floor, warehouse floor), operational specifications for each known existing IoT device 104A, 104B, 104N, and new IoT device 106, historical operational data for existing IoT device 104A, 104B, 104N, and new IoT device 106, and any other data pertinent to IoT device introduction manager 110 for introducing new IoT device 106 into an existing ecosystem with existing IoT devices 104A, 104B, and 104N. In the depicted embodiment, database 112 resides on server computer 102. A database is an organized collection of data, where database 112 can be implemented with any type of storage device capable of storing data and configuration files that can be accessed and utilized by IoT device introduction manager 110, such as a database server, a hard disk drive, or a flash memory.

Figure 2:
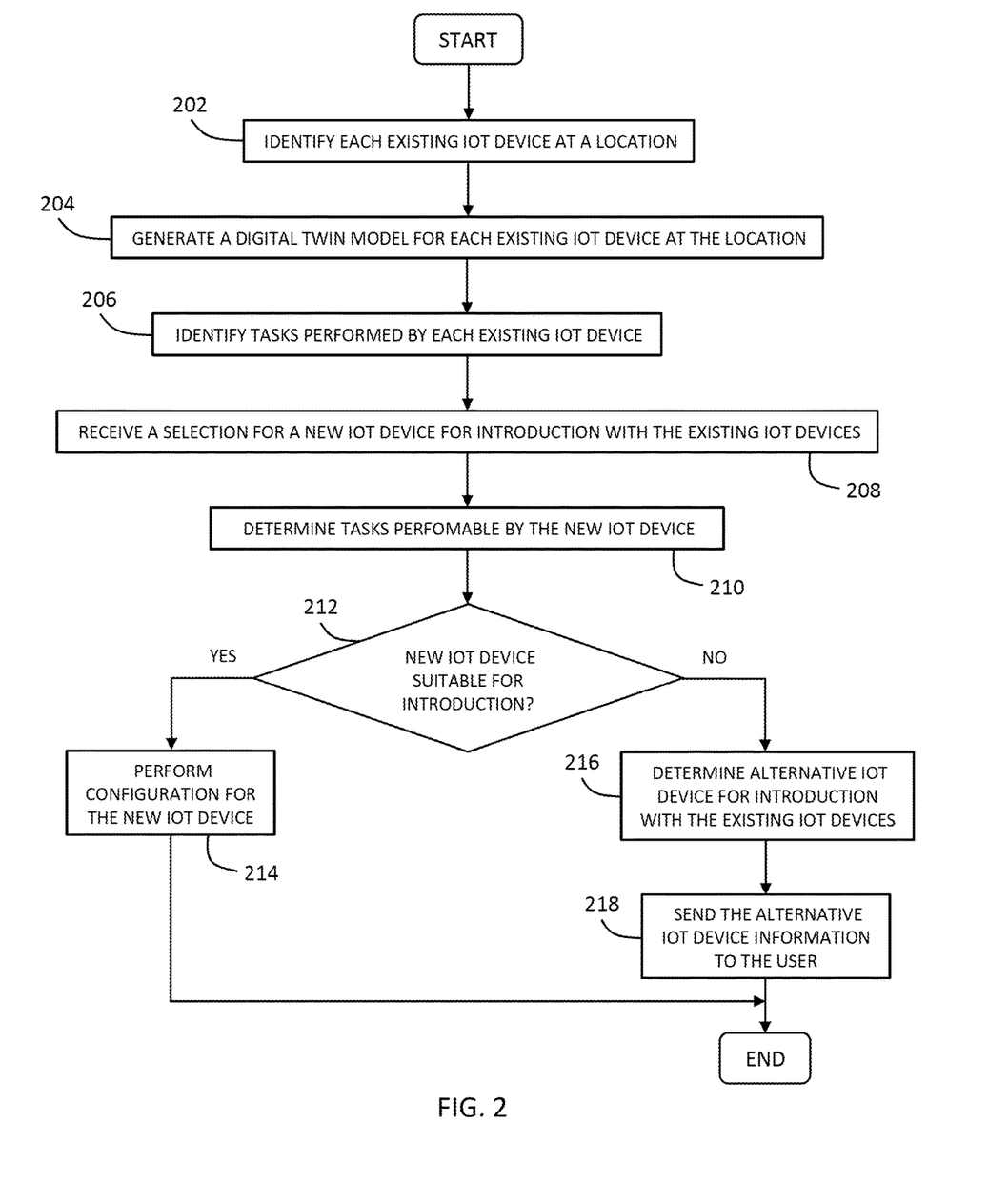
FIG. 2 is a flowchart depicting operational steps of an IoT device introduction manager for introducing a new IoT device into an existing ecosystem with multiple IoT devices, in accordance with an embodiment of the present invention.

FIG. 2 is a flowchart depicting operational steps of an IoT device introduction manager for introducing a new IoT device into an existing ecosystem with multiple IoT devices, in accordance with an embodiment of the present invention.

IoT device introduction manager 110 identifies each existing IoT device at a location (202). In one embodiment, IoT device introduction manager 110 identifies each existing IoT device at a warehouse facility, where an existing IoT device represents an electronic device or machine present on a warehouse floor for assisting with operations pertaining to sorting and managing inventory of various products. Multiple existing IoT devices in the warehouse facility form an ecosystem and the multiple existing IoT devices interact with one another to achieve a common goal of sorting and managing inventory of various products. Examples of existing IoT devices at the warehouse facility can include but is not limited to conveyor systems, automated packaging systems, electronic scales, label printers, packaging dispenser systems, electronic pallet jacks, and robotic platform systems. In another embodiment, IoT device introduction manager 110 identifies each existing IoT device at a manufacturing facility, where an existing represents an electronic device or machine present on a manufacturing floor for assisting with operations pertaining to producing various products. Similar to the previously mentioned embodiment, multiple existing IoT devices in the manufacturing facility form an ecosystem and the multiple existing IoT devices interact with one another to achieve a common goal of assisting with operations pertaining to producing various products. Examples of existing IoT devices at the manufacturing facility can include but is not limited to automated robotic assembly line systems, conveyor systems, robotic manufacturing platforms, automated welding systems, dicing machines, probing machines, polish grinders, high rigid grinders, chemical mechanical polishing (CMP) machines, edge shaping machines, and sliced wafer demounting and cleaning machines. For each existing IoT device, IoT device introduction manager 110 identifies various information including a model number, product specification, and various sensors for collecting operational data. IoT device introduction manager 110 can utilize an internal database to identify the various information and/or can query an external database associated with a manufacturer of the existing IoT devices to identify the various information.

IoT device introduction manager 110 generates a digital twin model for each existing IoT device at the location (204). As mentioned above, a digital twin model is a virtual representation of a real-time digital copy of a physical object, such as, an existing IoT device. IoT device introduction manager 110 can perform digital twin simulation with various digital twin models when determining whether a new IoT device is suitable for introduction into an ecosystem with the existing IoT devices at the location. Each existing IoT device at the location that IoT device introduction manager 110 identifies includes various operating parameters and various sensors for collecting operational data. Operating parameters can include user defined limitations for each existing IoT device, such as, temperature setting, pressure settings, movement settings, and any other user defined limitations for an existing IoT device at the location. IoT device introduction manager 110 can connect to each of the existing IoT devices at the location and receive current data (i.e., real-time) from each of the various sensors, where IoT device introduction manager 110 utilizes the current data to generate and continuously update a digital twin for each of the existing IoT devices. IoT device introduction manager 110 utilizes the various operating parameters, data from the various sensors, and product specification to generate a digital twin model for each existing IoT device previously identified at the location. Furthermore, IoT device introduction manager 110 utilizes a user provided floorplan for the location (e.g., warehouse floorplan, manufacturing floor plan) that includes a placement location for each of the existing IoT device, movements paths of each existing IoT device, sweeping areas of each existing IoT device, stationary objects, mobile objects, hazards, and local governance laws for the location, to generate an environment in which the existing IoT devices operate.

A placement location represents an area where a stationary existing IoT device is placed at the location. For example, an automated packing systems is a stationary existing IoT device within a warehouse facility for which IoT device introduction manager 110 identifies a placement location based on the user provided floorplan. In another example, a high ridge grinder is a stationary existing IoT device within a manufacturing facility for microprocessors for which IoT device introduction manager 110 identifies a placement location based on the user provided floorplan. A movement path represents an area where a nonstationary (i.e., mobile) existing IoT device moves at the location. For example, a robotic platform is a nonstationary existing IoT device within a warehouse facility for which IoT device introduction manager 110 identifies a movement path based on the user provided floorplan, where a foreign object or person in the movement path interferes with the operations of the nonstationary existing IoT device. A sweeping area represents an area for which at least one component on a stationary or nonstationary existing IoT device moves outside of either the placement location or the movement path. For example, an automated robotic assembly line system includes a base with a footprint representing a placement location of a stationary existing IoT device but an arm for installing components on a product includes a sweeping area that extends beyond the footprint of the base (i.e., the placement location). As the arm of the automated robotic assembly line system repeats a constant movement to install a component on the object, the area in which the arm moves, is the sweeping area of the automated robotic assembly line system. In another example, a robotic platform system includes a base with tracks that travels along a known movement path between a first area and a second area at a location. The robotic platform system is known to carry loads that extended beyond an area of the base and an area as defined by the movement path. An area in which the load on the robotic platform system extends beyond an area of the movement path represents the sweeping area.

Stationary objects represent non-mobile objects other than previously identified existing IoT devices at the location and can include, desks, pillars, walls, doors, or any other object that can impede movement of an existing IoT device. Mobile objects represent nonstationary objects other than previously identified existing IoT devices at the location and can include any non-stationary objects manually (e.g., pallet jacks, carts) operated by individuals at a warehouse facility or a manufacturing facility. IoT device introduction manager 110 utilizes random movement patterns for the mobile objects in a digital simulation, since no known movement path is available for the mobile objects. Hazards representing objects that can impede and or encroach on a placement location, a movement path, or a sweeping area. For example, IoT device introduction manager 110 determines a manufacturing facility includes 15 foot ceiling but plumbing for a fire suppression system a suspended 1 foot from the ceiling. Therefore, the true ceiling height for the manufacturing facility based on the hazard is 14 feet. Local governance laws for the location represent rules to which placement and movement of existing IoT devices must abide by. For example, an eye washing station in a warehouse facility must be free of obstruction for a radius of 5 feet, where no existing IoT device or newly introduced IoT device can impede an area as defined by the 5 foot radius. In another example, where a 15 foot ceiling includes a fire suppression system suspend a foot from the ceiling, no existing IoT device or newly introduced device can be taller than 13 feet to allow for a minimum of a foot clearance.

IoT device introduction manager 110 identifies tasks performed by each existing IoT device (206). Based on the previously identified specification and the current data from sensors for each existing IoT device, IoT device introduction manager 110 identifies tasks performed by each existing IoT device. In one example, IoT device introduction manager 110 identifies a task performed by an existing IoT device, where the existing IoT device is an automated robotic assembly line system grabbing a component from a robotic manufacturing platform and installing the component inside of a product on a conveyor system. Other existing IoT devices include the robotic manufacturing platform and the conveyor system, where the combination of the existing IoT devices produce an ecosystem where all the machines and systems are interacting with one another. However, in addition to identifying the task being performed by the automated robotic assembly line system, IoT device introduction manager 110 utilizes the current data form the sensors on the automated robotic assembly line system to identify any movement for the automated robotic assembly line system, such as, rotate, grab, lift, rotate, place, and release. As mentioned above, the movements of the automated robotic assembly line system would produce the sweeping area. In another example, IoT device introduction manager 110 identifies a task performed by an existing IoT device, where the existing IoT device is a robotic manufacturing platform collecting boxed items from a conveyor system and traveling to a load dock with shipping container. The previously identified movement path is verified by sensors on the robotic manufacturing platform.

IoT device introduction manager 110 receives a selection for a new IoT device for introduction with the existing IoT device (208). The new IoT device presents a system or machine for introduction into an ecosystem with existing IoT devices operatively collectively to perform a task. The introduction of the new IoT device can include replacing an existing IoT device or providing additional assistance to the existing IoT devices within the ecosystem. In one embodiment, IoT device introduction manager 110 includes a database of with specification information for numerous IoT devices, where IoT device introduction manager 110 receives a user selection for new IoT device from the numerous IoT devices in the database. In another embodiments, IoT device introduction manager 110 receives a selection for a new IoT device that includes a system or machine type, along with specification information for the new IoT device from which IoT device introduction manager 110 can generate a digital twin aggregate (DTA).

IoT device introduction manager 110 determines tasks performable by the new IoT device (210). Based on the previously identified specification for the new IoT device, IoT device introduction manager 110 identifies tasks performable by the new IoT device. In one example, the new IoT device is a new conveyor system replacing an existing conveyor system (i.e., existing IoT device) in a warehouse facility. IoT device introduction manager 110 identifies tasks performable by the new IoT device, along with specification defined parameters for performing the identified task. For example, the new conveyor system is capable of moving a load with a maximum weight of 1500 lbs., at a maximum speed of 8 feet per second, with maximum dimensions measuring 96 inches by 96 inches and a height of 84 inches. In another example, the new IoT device is a robotic platform system for integration with existing IoT devices, including other robotic platform systems in a manufacturing facility. IoT device introduction manager 110 identifies tasks performable by the new IoT device, along with specification defined parameters for performing the identified task. For example, the new robotic platform system is capable of moving a load with a maximum weight of 200 lbs., at a maximum speed of 3 feet per second, and includes a load platform measuring 36 inches by 36 inches.

IoT device introduction manager 110 determines whether the new IoT device is suitable for introduction with the existing IoT devices at the location (decision 212). In the event IoT device introduction manager 110 determines the new IoT device is suitable for introduction with the existing IoT devices at the location ("yes" branch, decision 212), IoT device introduction manager 110 performs configuration for the new IoT device (214). In the event IoT device introduction manager 110 determines the new IoT device is not suitable for introduction with the existing IoT devices at the location ("no" branch, decision 212), IoT device introduction manager 110 determines an alternative IoT device for introduction with the existing IoT devices (216).

IoT device introduction manager 110 determines whether the new IoT device is suitable for introduction with the existing IoT devices at the location by performing a digital twin simulation on the existing IoT devices with the introduction of the new IoT device into the ecosystem at the location. In this embodiment, IoT device introduction manager 110 utilizes a digital twin instance (DTI) for an existing IoT device with current data from the various sensors and a digital twin aggregated (DTA) for the new IoT device which does not have current data available from the various sensors, since the product has yet to be physically introduced into the location. IoT device introduction manager 110 performs an aggerated digital twin simulation to determine how the new IoT device is to interact with the existing IoT devices at location. With the aggregate digital twin simulation, IoT device introduction manager 110 can validate automation process for the new IoT device with respect to the existing IoT devices in the ecosystem, identify what device-to-device communication can be performed between the new IoT device and the existing IoT devices, and identifying edge-to-edge computing capabilities of the new IoT device with respect to the existing IoT devices.

In one example, the new IoT device is a new conveyor system replacing an existing conveyor system (i.e., existing IoT device) in a warehouse facility. IoT device introduction manager 110 performs an aggregated digital simulation with a digital twin for the new conveyor system and digital twins for the existing IoT devices, minus the digital twin for the existing conveyor system being replaced in the warehouse facility. IoT device introduction manager 110 validates an automation process for the new conveyor system, while identifying a placement location for the new conveyor system based on the known floorplan for the warehouse facility. IoT device introduction manager 110 can identify what device-to-device communications are performable by the new conveyor system with respect to existing IoT devices, like a robotic platform system for transferring loads between the conveyer system and a storage rack. IoT device introduction manager 110 can also identify edge-to-edge computing capabilities for the new conveyor system, along with any potential computing requirements for handling by the existing IoT devices in an edge-to-edge environment. Based on the digital twin simulation, IoT device introduction manager 110 determines whether the new conveyor system is suitable for introduction with the existing IoT devices by replacing an existing conveyor system at the warehouse facility.

In another example, the new IoT device is a robotic platform system potentially being introduced into an ecosystem with various existing IoT devices in a manufacturing facility, where the various existing IoT devices include other robotic platform systems. IoT device introduction manager 110 performs an aggregated digital simulation with a digital twin for the new robotic platform system and digital twins for the existing IoT devices. With the digital simulation, IoT device introduction manager 110 validates an automation process for the new robotic platform system for integrations with the existing robotic platform systems, while identifying a movement path for the robotic platform system based on the known floorplan for the manufacturing facility and previously identified movement paths for the existing robotic platform systems. IoT device introduction manager 110 can identify what device-to-device communications are performable by the new robotic platform system with respect to existing IoT robotic platforms to ensure the new movement path associated with the new robotic platform system minimizes travel time and minimizes path intersections with previously identified movement paths for existing robotic platform systems. IoT device introduction manager 110 can also identify edge-to-edge computing capabilities for the new robotic platform system, along with any potential computing requirements for handling by the existing IoT devices in an edge-to-edge environment. Based on the digital twin simulation, IoT device introduction manager 110 determines whether the new robotic platform system is suitable for introduction with the existing IoT devices.

IoT device introduction manager 110 performs configuration for the new IoT device (214). Based on the results of the digital twin simulation, IoT device introduction manager 110 performs a configuration on the new IoT device to streamline the introduction of the new IoT device into the ecosystem with the existing IoT devices. The configuration can include a placement location, a movement path, a sweeping area, and settings for sensors on the new IoT device. IoT device introduction manager 110 can configure the new IoT device by instructing an administrative user to position the new IoT device at a placement location within the location to ensure the new IoT device does not interfere with operations of existing IoT devices and to ensure efficient operations between the new IoT device and the existing IoT devices. Alternatively, IoT device introduction manager 110 can configure the new IoT device by instructing the new IoT device to relocate to the specific placement location at the location, without administrative user intervention. In one example, a warehouse facility can include multiple areas for placing a new packaging dispenser system, but based on the digital twin simulation, IoT device introduction manager 110 determines a specific placement location near a conveyor systems and automated packaging system to ensure efficient operations between the systems.

IoT device introduction manager 110 can configure the new IoT device by defining a movement path by creating geofences with virtual borders and areas to ensure the new IoT device does not interfere with any existing IoT devices, stationary objects, mobile objects, and create any hazardous conditions at the location. In one example, IoT device introduction manager 110 configures a movement path for a robotic platform system, where the robotic platform system is to navigate between existing IoT devices in a warehouse facility. In addition to navigating between the existing IoT devices, IoT device introduction manager 110 configures the movement path to ensure the robotic platform system does not contact any stationary objects, impede on movements of mobile objects, and abide by any local governance laws for the location. IoT device introduction manager 110 can define a sweeping area for the new IoT device by defining movements and motions of the IoT device, such that the movements and motions do not interfere with any existing IoT devices, stationary objects, mobile objects, and create any hazardous conditions at the location. In one example, IoT device introduction manager 110 configures a sweeping area of an arm of an automated robotic assembly line system for installing components on a product, where the sweeping area of the arm does not contact existing IoT devices, stationary objects, mobile objects, and abides by any local governance laws for the location. IoT device introduction manager 110 can configure the new IoT device by setting operational parameters for each sensor on the new IoT device, where the operational parameters set operating ranges and thresholds for each of the sensors. In one example, an automated welding system is a new IoT device being introduced at a location and IoT device introduction manager 110 configures an emergency shut-off temperature threshold to 10,000° F. from a manufacturer's pre-configuration emergency shut-off temperature threshold of 12,000° F.

IoT device introduction manager 110 determines an alternative IoT device for introduction with the existing IoT devices (216). As previously discussed above, IoT device introduction manager 110 includes a database with specification information for numerous IoT devices, where IoT device introduction manager 110 identify an alternative IoT device based on results from the digital simulation. IoT device introduction manager 110 can select an alternative IoT device based on parameters that resulted in the new IoT device not being suitable for introduction into ecosystem with the existing IoT device. The parameters can include but is not limited to a payload limit, dimensions for a placement location, dimensions for sweeping area, and an operational speed. In one example, IoT device introduction manager 110 previously determined a new conveyor system for replacing an existing conveyor system in a warehouse facility was not suitable for introduction into the ecosystem, due to a maximum speed of the conveyor systems creating a backlog of packages in the ecosystem with existing IoT devices. IoT device introduction manager 110 can search an internal database and identify an alternative conveyor system with similar specification (e.g., dimensions, capacity, weight limits) but includes a higher maximum speed when compared to the new conveyor system that was not suitable for introduction.

IoT device introduction manager 110 sends the alternative IoT device information to the user (218). In one embodiment, IoT device introduction manager 110 sends the alternative IoT device information to a client device associated with an admirative user, where the alternative device information is sourced from the internal database and/or online directly from a manufacturer's website. IoT device introduction manager 110 can include a link to the manufacturer's website with the product information for the alternative IoT device. Furthermore, IoT device introduction manager 110 can include results of for the digital simulation with the new IoT device that was not suitable for introduction into the ecosystem with the existing IoT devices, along with a list of the parameters that resulted in the new IoT device not being suitable.

Embodiments of the present invention can also allow for the user to perform verbal interaction with a new IoT device to understand how the new IoT device can improve overall effectiveness in the smart ecosystem, prior to purchasing of the new IoT device. Embodiments of the present invention can perform a digital simulation with the presence of the new IoT device in the ecosystem with existing IoT devices to identify how the new IoT device is to be integrated into the ecosystem. During the simulation of the ecosystem with the new IoT device, embodiments of the present invention can analyze the existing capability of the ecosystem and how the addition of the new IoT device can enable a performing of additional automation workflow sequences. Embodiments of the present invention can analyze the specification and capabilities of the new IoT device and simulate what additional edge computing capability can be improved with the presence of the new IoT device (e.g., time saving, speed of processing). Based on user's interaction with the new IoT device, embodiments of the present invention can introduce the new IoT device into the ecosystem, by configuring the new IoT device based on the simulation.

Figure 3:
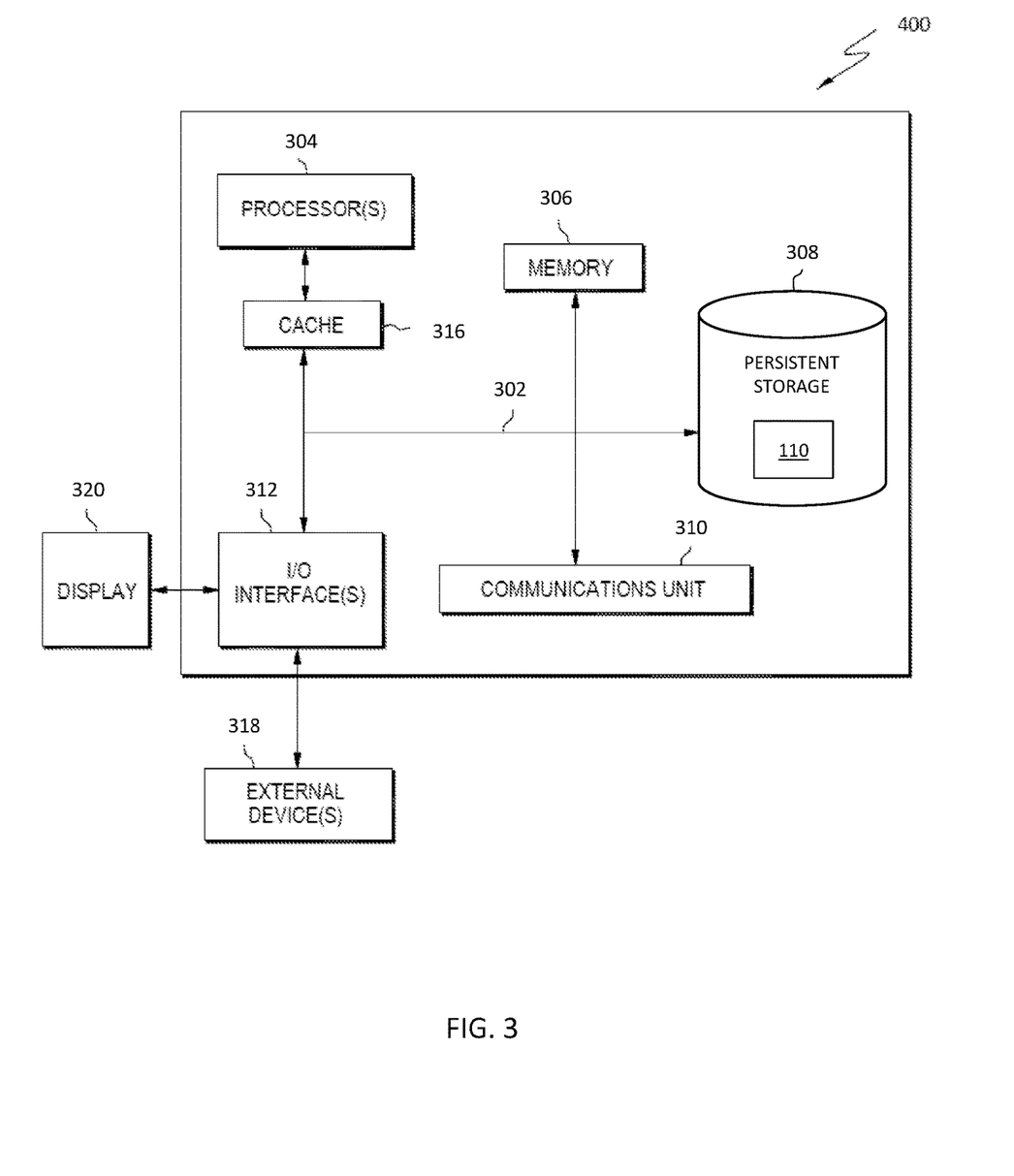
FIG. 3 is a block diagram of components of a computer system, such as the server computer of FIG. 1, in accordance with an embodiment of the present invention.

FIG. 3 depicts computer system 300, where server computer 102 is an example of a computer system 300 that includes IoT device introduction manager 110. The computer system includes processors 304, cache 316, memory 306, persistent storage 308, communications unit 310, input/output (I/O) interface(s) 312 and communications fabric 302. Communications fabric 302 provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of processors 304 by holding recently accessed data, and data near recently accessed data, from memory 306.

Program instructions and data used to practice embodiments of the present invention may be stored in persistent storage 308 and in memory 306 for execution by one or more of the respective processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Program instructions and data used to practice embodiments of the present invention may be downloaded to persistent storage 308 through communications unit 310.

I/O interface(s) 312 allows for input and output of data with other devices that may be connected to each computer system. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 also connect to display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
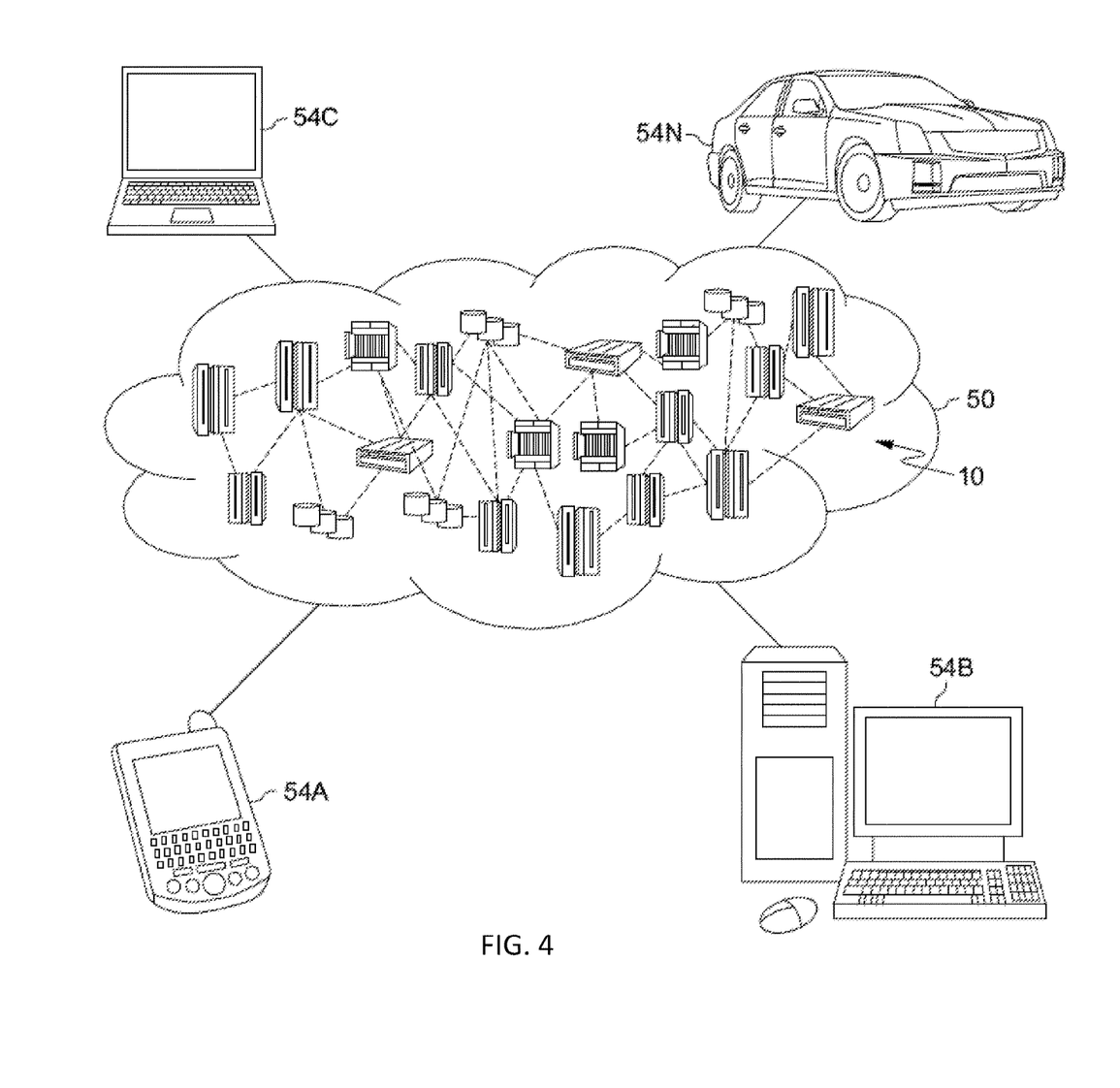
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
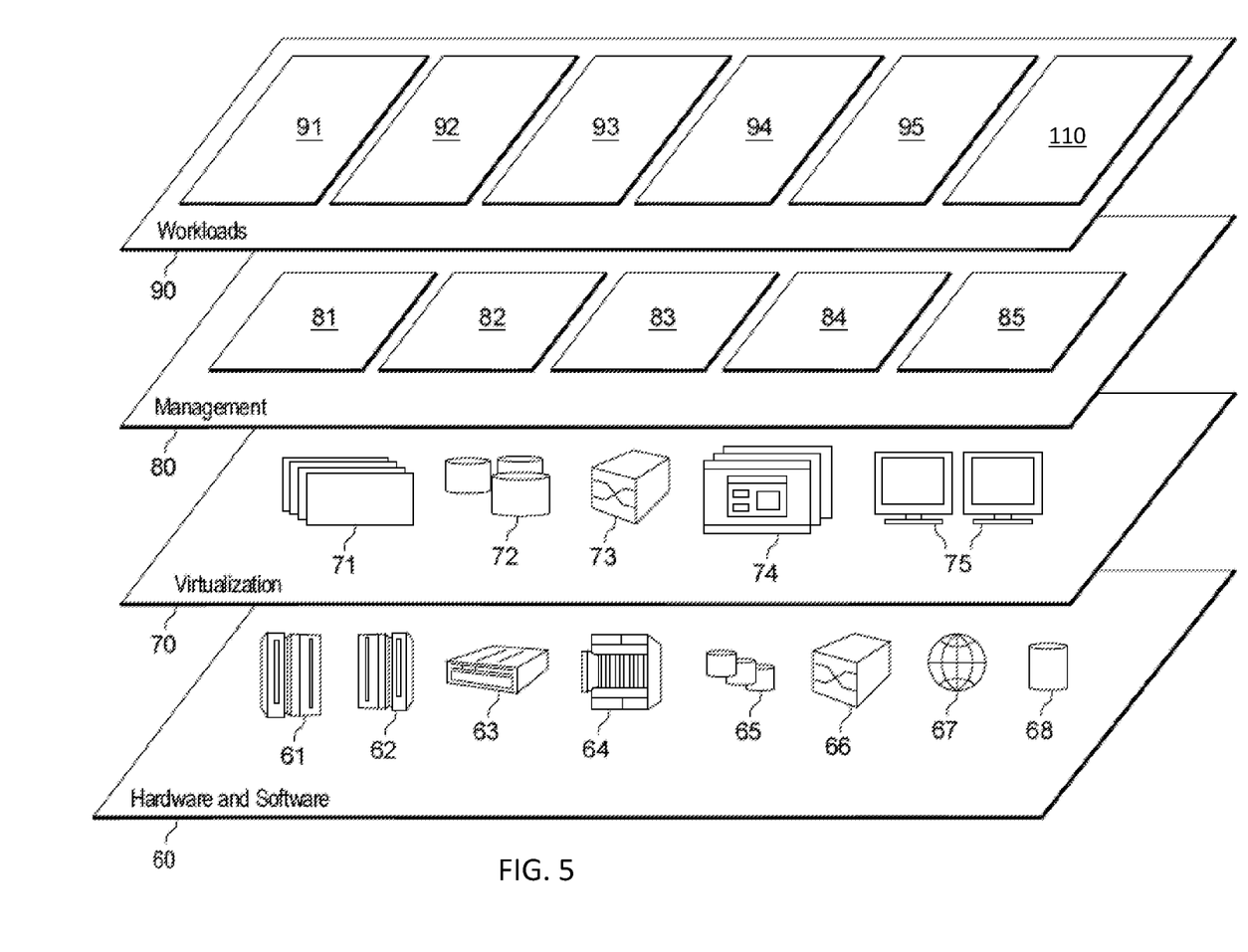
FIG. 5 depicts abstraction model layers, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and IoT device introduction manager 110.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
identifying a plurality of existing IoT devices at a location;
generating a digital twin model for each of the plurality of existing IoT devices at the location, wherein the digital twin model is based on data gathered from a plurality of sensors on the plurality of existing IoT devices;
identifying one or more physical tasks performed by each of the plurality of existing IoT devices at the location;
receiving a selection for a new IoT device for introduction to the location with the plurality of existing IoT devices based on the one or more physical tasks performed by each of the plurality of existing IoT devices and the generated digital twin models for the plurality of existing IoT devices;
responsive to determining one or more physical tasks performable by the new IoT device, determining whether the new IoT device is suitable for the introduction to the location with the plurality of existing IoT devices based on the one or more physical tasks performable by the new IoT device physically interfering with at least one existing IoT device from the plurality of existing IoT devices; and
responsive to determining the new IoT device is suitable for the introduction to the location with the plurality of existing IoT devices based on the one or more physical tasks performable by the new IoT device not physically interfering with the at least one existing IoT device from the plurality of existing IoT devices, performing a configuration for the new IoT device based on the one or more physical tasks performable by the new IoT device at the location.

2. The computer-implemented method of claim 1, wherein determining whether the new IoT device is suitable for the introduction to the location with the plurality of existing IoT devices further comprises:
performing a digital twin simulation with the digital twin model for each of the plurality of existing IoT device and a digital twin aggregate for the new IoT device, wherein the digital twin aggregate is based on manufacturer specification information and the one or more physical tasks performable by the new IoT device.

3. The computer-implemented method of claim 2, wherein the digital twin model for each of the plurality of existing IoT device is a digital twin instance.

4. The computer-implemented method of claim 1, wherein performing the configuration for the new IoT device further comprises:
instructing the new IoT device to relocate to a placement location at the location for the introduction into an ecosystem with the plurality of existing IoT devices.

5. The computer-implemented method of claim 1, wherein performing the configuration for the new IoT device further comprises:
defining a movement path for the new IoT device with geofences, wherein the movement path does not interfere with a placement location for each of the plurality of existing IoT devices, a plurality of stationary object, and a plurality of mobile objects.

6. The computer-implemented method of claim 1, wherein performing the configuration for the new IoT device further comprises:
defining a sweeping area for movements performable by the new IoT device, wherein the sweeping area represents an area for which at least one component on the new IoT device moves outside of either a placement location or a movement path, and wherein the sweeping area of the at least one component on the new IoT device does not physically contact with each of:
the plurality of existing IoT devices, a plurality of stationary object, and a plurality of mobile objects.

7. The computer-implemented method of claim 1, wherein performing the configuration for the new IoT device further comprises:
setting a plurality of operational parameters for a plurality of sensors on the new IoT device, wherein the plurality of operational parameters set operating ranges and threshold limits for each sensor from the plurality of sensors on the new IoT device based on a digital twin aggregate for the new IoT device and the digital twin model for each of the plurality of existing IoT devices, and wherein the plurality of operational parameters set operating ranges and the threshold limits prevent the one or more physical tasks performable by the new IoT device from physically interfering with the at least one existing IoT device from the plurality of existing IoT devices.

8. A computer program product comprising one or more computer readable storage media and program instructions collectively stored on the one or more computer readable storage media, the stored program instructions executable by one or more computer processors, the stored program instructions comprising:
identifying a plurality of existing IoT devices at a location;
generating a digital twin model for each of the plurality of existing IoT devices at the location, wherein the digital twin model is based on data gathered from a plurality of sensors on the plurality of existing IoT devices;
identifying one or more physical tasks performed by each of the plurality of existing IoT devices at the location;
receiving a selection for a new IoT device for introduction to the location with the plurality of existing IoT devices based on the one or more physical tasks performed by each of the plurality of existing IoT devices and the generated digital twin models for the plurality of existing IoT devices;
responsive to determining one or more physical tasks performable by the new IoT device, determining whether the new IoT device is suitable for the introduction to the location with the plurality of existing IoT devices based on the one or more physical tasks performable by the new IoT device physically interfering with at least one existing IoT device from the plurality of existing IoT devices; and
responsive to determining the new IoT device is suitable for the introduction to the location with the plurality of existing IoT devices based on the one or more physical tasks performable by the new IoT device not physically interfering with the at least one existing IoT device from the plurality of existing IoT devices, performing a configuration for the new IoT device based on the one or more physical tasks performable by the new IoT device at the location.

9. The computer program product of claim 8, wherein determining whether the new IoT device is suitable for the introduction to the location with the plurality of existing IoT devices, the stored program instructions further comprises:
performing a digital twin simulation with the digital twin model for each of the plurality of existing IoT device and a digital twin aggregate for the new IoT device, wherein the digital twin aggregate is based on manufacturer specification information and the one or more physical tasks performable by the new IoT device.

10. The computer program product of claim 9, wherein the digital twin model for each of the plurality of existing IoT device is a digital twin instance.

11. The computer program product of claim 8, wherein performing the configuration for the new IoT device, the stored program instructions further comprises:
instructing the new IoT device to relocate to a placement location at the location for the introduction into an ecosystem with the plurality of existing IoT devices.

12. The computer program product of claim 8, wherein performing the configuration for the new IoT device, the stored program instructions further comprises:
defining a movement path for the new IoT device with geofences, wherein the movement path does not interfere with a placement location for each of the plurality of existing IoT devices, a plurality of stationary object, and a plurality of mobile objects.

13. The computer program product of claim 8, wherein performing the configuration for the new IoT device, the stored program instructions further comprises:
defining a sweeping area for movements performable by the new IoT device, wherein the sweeping area represents an area for which at least one component on the new IoT device moves outside of either a placement location or a movement path, and wherein the sweeping area of the at least one component on the new IoT device does not physically contact with each of:
the plurality of existing IoT devices, a plurality of stationary object, and a plurality of mobile objects.

14. The computer program product of claim 9, wherein performing the configuration for the new IoT device, the stored program instructions further comprises:

setting a plurality of operational parameters for a plurality of sensors on the new IoT device, wherein the plurality of operational parameters set operating ranges and threshold limits for each sensor from the plurality of sensors on the new IoT device based on the digital twin aggregate for the new IoT device and the digital twin model for each of the plurality of existing IoT devices, and wherein the plurality of operational parameters set operating ranges and threshold limits prevent the one or more physical tasks performable by the new IoT device from physically interfering with at least one existing IoT device from the plurality of existing IoT devices.

15. A computer system comprising:
one or more computer processors;
one or more computer readable storage media; and
program instructions stored on the computer readable storage media for execution by at least one of the one or more computer processors, the program instructions comprising:
identifying a plurality of existing IoT devices at a location;
generating a digital twin model for each of the plurality of existing IoT devices at the location, wherein the digital twin model is based on data gathered from a plurality of sensors on the plurality of existing IoT devices;
identifying one or more physical tasks performed by each of the plurality of existing IoT devices at the location;
receiving a selection for a new IoT device for introduction to the location with the plurality of existing IoT devices based on the one or more physical tasks performed by each of the plurality of existing IoT devices and the generated digital twin models for the plurality of existing IoT devices;
responsive to determining one or more physical tasks performable by the new IoT device, determining whether the new IoT device is suitable for the introduction to the location with the plurality of existing IoT devices based on the one or more physical tasks performable by the new IoT device physically interfering with at least one existing IoT device from the plurality of existing IoT devices; and
responsive to determining the new IoT device is suitable for the introduction to the location with the plurality of existing IoT devices based on the one or more physical tasks performable by the new IoT device not physically interfering with the at least one existing IoT device from the plurality of existing IoT devices, performing a configuration for the new IoT device based on the one or more physical tasks performable by the new IoT device at the location.

16. The computer system of claim 15, wherein determining whether the new IoT device is suitable for the introduction to the location with the plurality of IoT devices, the stored program instructions further comprises:
performing a digital twin simulation with the digital twin model for each of the plurality of existing IoT device and a digital twin aggregate for the new IoT device, wherein the digital twin aggregate is based on manufacturer specification information and the one or more physical tasks performable by the new IoT device.

17. The computer system of claim 16, wherein the digital twin model for each of the plurality of existing IoT device is a digital twin instance.

18. The computer system of claim 15, wherein performing the configuration for the new IoT device, the stored program instructions further comprises:
instructing the new IoT device to relocate to a placement location at the location for the introduction into an ecosystem with the plurality of existing IoT devices.

19. The computer system of claim 15, wherein performing the configuration for the new IoT device, the stored program instructions further comprises:
defining a movement path for the new IoT device with geofences, wherein the movement path does not interfere with a placement location for each of the plurality of existing IoT devices, a plurality of stationary object, and a plurality of mobile objects.

20. The computer system of claim 15, wherein performing the configuration for the new IoT device, the stored program instructions further comprises:
defining a sweeping area for movements performable by the new IoT device, wherein the sweeping area represents an area for which at least one component on the new IoT device moves outside of either a placement location or a movement path, and wherein the sweeping area of the at least one component on the new IoT device does not physically contact with each of:
the plurality of existing IoT devices, a plurality of stationary object, and a plurality of mobile objects.

* * * * *